US012643275B2

(12) United States Patent
Johnson et al.

(10) Patent No.: US 12,643,275 B2
(45) Date of Patent: Jun. 2, 2026

(54) POLYMERIC FILM AND METHOD OF MAKING SAME

(71) Applicant: 3M INNOVATIVE PROPERTIES COMPANY, St. Paul, MN (US)

(72) Inventors: Stephen A. Johnson, Woodbury, MN (US); William T. Fay, Woodbury, MN (US); Atheen R. Johnson, Woodbury, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 18/690,968

(22) PCT Filed: Sep. 6, 2022

(86) PCT No.: PCT/IB2022/058378
§ 371 (c)(1),
(2) Date: Mar. 11, 2024

(87) PCT Pub. No.: WO2023/047222
PCT Pub. Date: Mar. 30, 2023

(65) Prior Publication Data
US 2024/0375337 A1     Nov. 14, 2024

Related U.S. Application Data

(60) Provisional application No. 63/246,828, filed on Sep. 22, 2021, provisional application No. 63/247,144, filed on Sep. 22, 2021.

(51) Int. Cl.
*B32B 3/30*          (2006.01)
*B29C 48/00*         (2019.01)
(Continued)

(52) U.S. Cl.
CPC .......... *B29C 48/23* (2019.02); *B29C 48/0021* (2019.02); *B29C 48/022* (2019.02); (Continued)

(58) Field of Classification Search
CPC .......... B32B 3/30; B32B 27/32; B32B 27/36; B29C 59/007
See application file for complete search history.

(56) References Cited

U.S. PATENT DOCUMENTS

| | | | |
|---|---|---|---|
| 4,835,835 A | 6/1989 | Gould | |
| 5,217,794 A | 6/1993 | Schrenk | |

(Continued)

FOREIGN PATENT DOCUMENTS

| | | | |
|---|---|---|---|
| WO | 2007079913 A1 | 7/2007 | |
| WO | 2009140493 A1 | 11/2009 | |

(Continued)

OTHER PUBLICATIONS

International Search Report for PCT International Application No. PCT/IB2022/058378, mailed on Feb. 7, 2023, 4 pages.

*Primary Examiner* — Joanna Pleszczynska
(74) *Attorney, Agent, or Firm* — Clifton F. Richardson

(57)          ABSTRACT

A polymeric film has an orthogonal length and width. The polymeric film includes a substrate and a plurality of fins extending away from the substrate and substantially coextensive with the substrate along the length. The fins are arranged across the width. Each fin in at least a majority of the fins includes a first portion extending from the substrate to a tip of the fin opposite the substrate; and a second portion extending from the tip of the fin toward or to the substrate. The second portion is attached to the first portion proximate the tip and separated from the first portion proximate the
(Continued)

substrate along at least a portion of the length. The first and second portions have different respective first and second compositions.

14 Claims, 11 Drawing Sheets

(51) Int. Cl.

| | |
|---|---|
| *B29C 48/21* | (2019.01) |
| *B29C 48/23* | (2019.01) |
| *B29C 59/00* | (2006.01) |
| *B29C 59/02* | (2006.01) |
| *B32B 27/32* | (2006.01) |
| *B32B 27/36* | (2006.01) |
| *B29K 23/00* | (2006.01) |
| *B29K 67/00* | (2006.01) |
| *B29K 96/04* | (2006.01) |
| *B29L 7/00* | (2006.01) |

(52) U.S. Cl.
CPC ............ *B29C 48/21* (2019.02); *B29C 59/005* (2013.01); *B29C 59/007* (2013.01); *B29C 59/02* (2013.01); *B29K 2023/12* (2013.01); *B29K 2023/14* (2013.01); *B29K 2067/003* (2013.01); *B29K 2096/04* (2013.01); *B29K 2995/0037* (2013.01); *B29L 2007/001* (2013.01)

(56) References Cited

U.S. PATENT DOCUMENTS

| | | | |
|---|---|---|---|
| 5,344,681 A | 9/1994 | Calhoun et al. | |
| 5,344,691 A | 9/1994 | Hanschen et al. | |
| 5,429,856 A | 7/1995 | Krueger et al. | |
| 5,449,540 A | 9/1995 | Calhoun et al. | |
| 5,468,428 A | 11/1995 | Hanschen et al. | |
| 6,197,397 B1 | 3/2001 | Sher et al. | |
| 6,447,875 B1 | 9/2002 | Norquist et al. | |
| 6,478,918 B2 | 11/2002 | Bennett et al. | |
| 6,531,206 B2 * | 3/2003 | Johnston ................. | B01D 1/00 428/167 |
| 6,686,026 B2 | 2/2004 | Spiewak et al. | |
| 6,767,492 B2 | 7/2004 | Norquist et al. | |
| 6,949,283 B2 | 9/2005 | Kollaja et al. | |
| 6,984,439 B2 | 1/2006 | Topolkaraev | |
| 7,060,351 B2 | 6/2006 | Hannington | |
| 7,303,642 B2 | 12/2007 | Topolkaraev | |
| 7,678,316 B2 | 3/2010 | Ausen et al. | |
| 7,914,208 B2 | 3/2011 | Sprehe | |
| 7,968,172 B2 | 6/2011 | Ausen et al. | |
| 8,883,290 B2 | 11/2014 | Lowe | |
| 9,718,992 B2 | 8/2017 | Traser et al. | |
| 9,724,865 B2 | 8/2017 | Ausen et al. | |
| 9,856,403 B2 | 1/2018 | Jeon et al. | |
| 10,001,587 B2 | 6/2018 | Liu | |
| 10,214,664 B2 | 2/2019 | Lowe | |
| 10,730,220 B2 | 8/2020 | Ausen et al. | |
| 2003/0221770 A1 | 12/2003 | Meixner et al. | |
| 2004/0089412 A1 | 5/2004 | Topolkaraev | |
| 2004/0187276 A1 * | 9/2004 | Seth ........................ | B29C 48/07 24/452 |
| 2007/0053168 A1 * | 3/2007 | Sayir ..................... | H01L 23/367 257/E23.105 |
| 2007/0154683 A1 | 7/2007 | Ausen et al. | |
| 2008/0078500 A1 | 4/2008 | Sher et al. | |
| 2014/0137377 A1 * | 5/2014 | Cheng ..................... | B29C 43/46 24/449 |
| 2014/0154089 A1 | 6/2014 | Traser et al. | |
| 2015/0043840 A1 | 2/2015 | Bois et al. | |
| 2017/0203882 A1 | 7/2017 | Bois et al. | |
| 2017/0314532 A1 | 11/2017 | Kirkegaard et al. | |
| 2019/0270271 A1 | 9/2019 | Slama et al. | |
| 2019/0369314 A1 | 12/2019 | Hebrink et al. | |
| 2020/0189164 A1 | 6/2020 | Free et al. | |
| 2021/0100323 A1 * | 4/2021 | Takakuwa .......... | A44B 18/0076 |

FOREIGN PATENT DOCUMENTS

| | | |
|---|---|---|
| WO | 2011057226 A1 | 5/2011 |
| WO | 2014200812 A2 | 12/2014 |
| WO | 2018203260 A1 | 11/2018 |
| WO | 2019164723 A1 | 8/2019 |
| WO | 2020170115 A1 | 8/2020 |
| WO | 2021044345 A1 | 3/2021 |
| WO | 2023031713 A1 | 3/2023 |
| WO | 2023047223 A1 | 3/2023 |
| WO | 2023214244 A1 | 11/2023 |

* cited by examiner

444

432

420

159

θ2

455

θ1

158

410

431

433 y x      z

431

420 420 420

410 410 410 y z      x

431

431

POLYMERIC FILM AND METHOD OF MAKING SAME

CROSS REFERENCE TO RELATED APPLICATIONS

This application is a national stage filing under 35 U.S.C. 371 of PCT/IB2022/058378, filed Sep. 6, 2022, which claims the benefit of U.S. Application Nos. 63/246,828 and 63/247,144, filed Sep. 22, 2021, the disclosures of which are incorporated by reference in their entireties herein.

SUMMARY

In some aspects, the present description provides a polymeric film that has an orthogonal length and width. The polymeric film includes a substrate and a plurality of fins extending away from the substrate and substantially coextensive with the substrate along the length. The fins are arranged across the width. Each fin in at least a majority of the fins includes a first portion extending from the substrate to a tip of the fin opposite the substrate; and a second portion extending from the tip of the fin toward or to the substrate. The second portion is attached to the first portion proximate the tip and separated from the first portion proximate the substrate along at least a portion of the length. The first and second portions can have different respective first and second compositions.

In some aspects, the present description provides a polymeric film that has an orthogonal length and width. The polymeric film includes a substrate; and a plurality of fins extending along the length and arranged across the width. The plurality of fins is substantially coextensive with the substrate along the length. The substrate has an average thickness T in a direction orthogonal to the length and width. The fins extend from the substrate to an average height H along a height direction and have an average width W at tips of the fins along a direction orthogonal to the height direction. In some embodiments, H/W≥40 and H/T≥40.

In some aspects, the present description provides a polymeric film including a first substrate; and a plurality of fins extending along a length direction of the polymeric film and being substantially coextensive with the first substrate along the length direction. The fins extend along a height direction to an average height H from attachment portions of the fins attached to the first substrate. The attachment portions are spaced apart at an average spacing S along a width direction of the polymeric film substantially orthogonal to the length direction and to a thickness direction of the polymeric film. H can be greater than S. The height direction can be sufficiently tilted relative to the thickness direction that adjacent fins contact one another.

In some aspects, the present description provides a thermal management system that includes a polymeric film including a substrate and a plurality of fins extending away from the substrate.

In some aspects, the present description provides a method for making at least a first polymeric film. The first polymeric extends along a length direction of the first polymeric film and has a width along a width direction of the first polymeric film orthogonal to the length direction. The method includes extruding first and second resins through respective first and second pluralities of slots in a slot plate to form a molten stack of alternating respective first and second extended elements. Each of the first and second pluralities of slots has a flow direction angled relative to a first plane defined by the length and width directions. The first and second extended elements extending along the length direction and are tilted in a second plane orthogonal to the length direction. The method includes extruding first and second skin layers onto respective opposite first and second sides of the molten stack to form a molten film; compressing the molten film in a thickness direction orthogonal to the length and width directions; and cooling the molten film to form the first polymeric film.

These and other aspects will be apparent from the following detailed description. In no event, however, should this brief summary be construed to limit the claimable subject matter.

DETAILED DESCRIPTION

In the following description, reference is made to the accompanying drawings that form a part hereof and in which various embodiments are shown by way of illustration. The drawings are not necessarily to scale. It is to be understood that other embodiments are contemplated and may be made without departing from the scope or spirit of the present description. The following detailed description, therefore, is not to be taken in a limiting sense.

According to some embodiments of the present description, a polymeric film is provided that provides a plurality of fins extending along a length of the film. The film can be an extruded and/or integrally formed film. A film is integrally formed if the various portions of the film are manufactured together rather than manufactured separately and then subsequently joined. It has been found, according to some embodiments, that fins having a high aspect ratio (e.g., a height of at least 40 times a width) can be provided in an integrally formed film by coextruding a web including a plurality of tilted extended elements disposed between two skin layers and then removing one of the skin layers and rotating the extended elements. The fins can include substantially coextensive first and second portions having different compositions. The films, according to some embodiments, have been found to be useful, for example, for transporting materials and/or energy through the film along the length of the film. For example, the fins can be used for directing fluid along a surface of the film where the fluid can be heated or cooled so that the film can be used as a heat exchanger, for example. Such films can be useful for battery cooling, for example. Battery systems cooled using polymeric heat exchanger films are described in International Appl. Pub. No. WO 2021/044345 (Bartling et al.), for example. The films may alternatively, or in addition, be utilized as packaging films, according to some embodiments.

Figure 1:
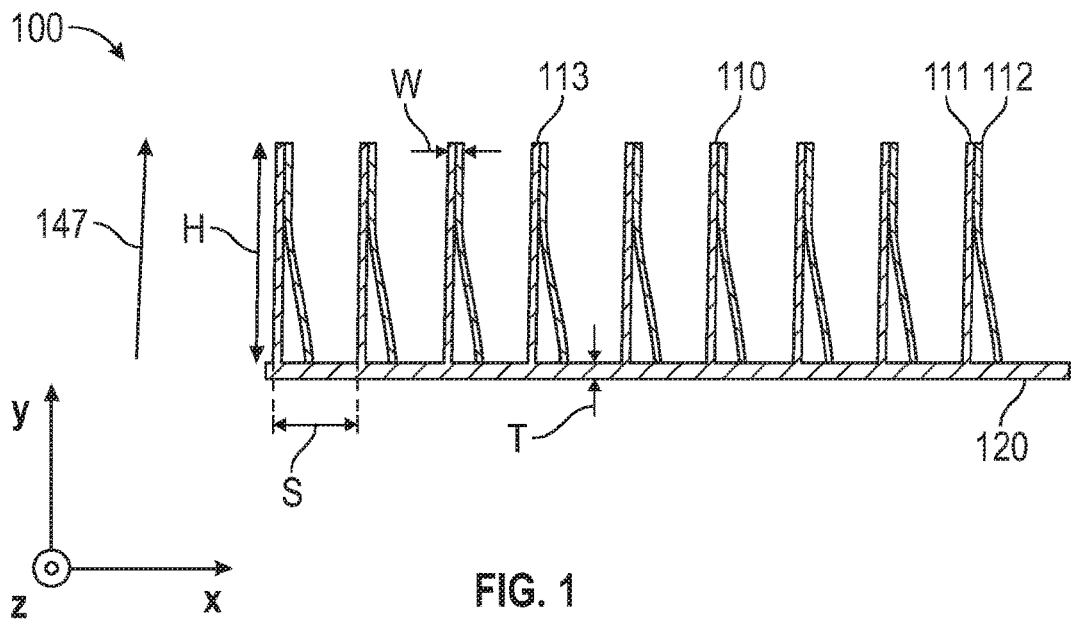
FIG. 1 is a schematic cross-sectional view of a polymeric film, according to some embodiments.
Figure 2:
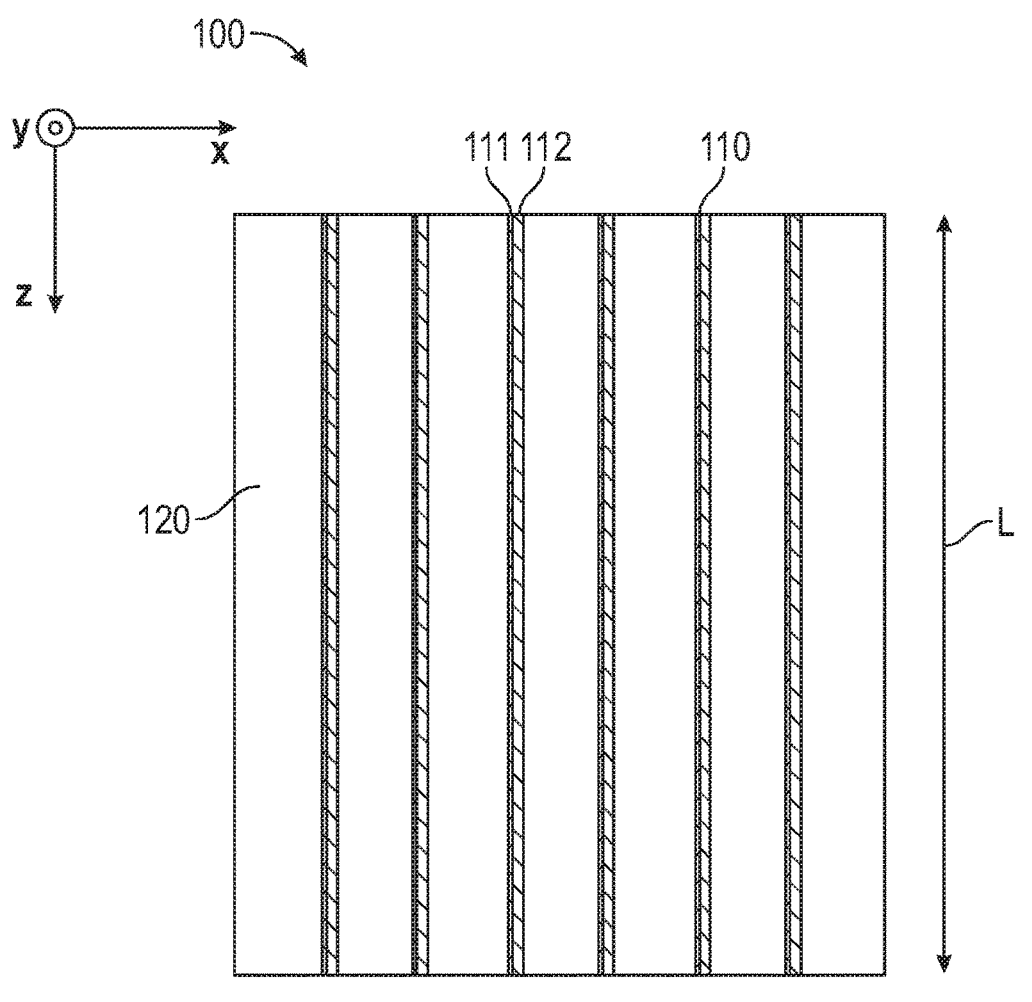
FIG. 2 is a schematic top view of a polymeric film, according to some embodiments.

FIG. 1 is a schematic cross-sectional view of a polymeric film 100, according to some embodiments. FIG. 2 is a schematic top view of a polymeric film 100, according to some embodiments. The polymeric film 100 has an orthogonal length and width. That is, the length and width are along respective length (z-direction) and width (x-direction) directions that are orthogonal. The polymeric film 100 includes a substrate 120 and a plurality of fins 110 substantially coextensive with the substrate 120 along the length (along the length direction (z-direction) of the polymeric film 100). The substrate, which may also be referred to a substrate portion, may be a portion of the film that has a substantially constant thickness. The substrate can be integrally formed with the fins. The fins 110 extend away from the substrate 120 and along the length and are arranged along the width (along the width direction (x-direction) of the polymeric film). The fins 110 can extend away from the substrate 120 to an average height H along a height direction 147. Each fin 110 can have a minimum width, which is a minimum distance between opposing major surfaces of the extended element along a direction substantially orthogonal (e.g., within 30, 20, 10, or 5 degrees of orthogonal) to the major surfaces. The minimum thickness can occur in an upper portion of the extended element (e.g., at a tip 113). For example, in some embodiments, an extended element 110 include first and second portions 111 and 112 which are attached to one another proximate a tip 113 of the extended element, and the minimum width can be substantially equal to a total combined thickness of the first and second portions 111 and 112. An average of the minimum widths is W which may be referred to as the average width at the tips of the fins. In some embodiments, H/W is at least 40 or is in another range described elsewhere herein. In some embodiments, the extended elements are spaced apart along the width direction and are arranged at an average spacing S which may be greater than 10 W, and/or greater than 10 times an average thickness T of the substrate, and/or less than the average height H, or in another range described elsewhere herein. The spacing S can be described as the center to center distance between fins. The fins may be regularly arranged along the width at a pitch equal to the average spacing S.

Layers or elements can be described as substantially coextensive with each other if at least about 60% by area (e.g., in a plan view facing a major surface of the layers or elements) of each layer or element is coextensive with at least about 60% by area of each other layer or element. In some embodiments, for layers or elements describes as substantially coextensive, at least about 70%, or at least about 80%, or at least about 90% by area of each layer or element is coextensive with at least about 70%, or at least about 80%, or at least about 90% by area of each other layer or element. Layers or elements can be described as substantially coextensive with each other in length and/or width if at least about 60% of the length and/or width of each layer or element is co-extensive with at least about 60% of the length and/or width of each other layer or element. In some embodiments, for layers or elements described as substantially coextensive with each other in length and/or width, at least about 80% or at least about 90% of each layer or element is co-extensive in length and/or width with at least about 80% or at least about 90% of the length and/or width of each other layer or element.

The extended elements 110 may be referred to as fins. In some embodiments, each extended element (or fin) in at least a majority (greater than 50%) of the extended elements (or fins), includes a first portion 111 extending from the substrate 120 to a tip 113 of the extended element (or fin) opposite the substrate 120; and a second portion 112 extending from the tip 113 of the extended element (or fin) toward or to the substrate 120. The second portion 112 can be attached to the first portion 111 proximate the tip and can be separated from the first portion 111 proximate the substrate 120 along at least a portion of a length L of the extended element (or fin) along the length. In some embodiments, the first and second portions 111 and 112 have different respective first and second compositions, as described further elsewhere herein. The first and second portions 111 and 112 of a fin or extended element can individually be an extended element and may be referred to as first and second extended elements.

In some embodiments, a polymeric film 100 has an orthogonal length and width and includes a substrate 120 and a plurality of fins 110 extending along the length (along the length direction (z-direction) of the polymeric film 100) and being arranged across the width (across the width direction (x-direction) of the polymeric film). In some embodiments, the plurality of fins is substantially coextensive with the substrate 120 along the length. In some embodiments, each of the fins, or each fin in at least a majority of the fins, or each fin in at least 60, 70, 80, or 90 percent of the fins, is substantially coextensive with the substrate 120 along the length. The substrate 120 has an average thickness T in a thickness direction (y-direction) orthogonal to the length and width. In some embodiments, the fins 110 extend from the substrate 120 to an average height H along a height direction 147 and have an average width W at tips of the fins mean of the minimum widths of the fins 110 along a direction orthogonal to the height direction 147. The height direction 147 may be within 30, 20, or 10 degrees of parallel to the thickness direction (y-direction) for each fin in at least a majority of the fins 110. In some embodiments, W is in a range of 0.05 to 2 mm. In some embodiments, $H/W \geq 40$, 80, 100, 120, 150, or 200. In some such embodiments, or in other embodiments, $H/T \geq 40$, 80, 100, 120, 150, or 200. For example, in some embodiments, $H/W \geq 80$ and $H/T \geq 80$. H/W and/or H/T may be up to 10,000, 5000, 1000, 500, or 250, for example.

In some embodiments, the fins 110 are spaced apart along the width and are arranged at an average spacing S (or pitch) which may be greater than 10 T, or greater than 20 T, or greater than 30 T, for example. The spacing S may be up to 1000 or 10,000 times T, for example. In some embodiments, the fins 110 are regularly arranged along the width direction. In some such embodiments, or in other embodiments, the fins are arranged at an average spacing S in a range of 0.1 to 3 cm. In some embodiments, H>S. For example, H can be at least 1.5, 2, 2.5, or 3 times S. H can be up to 100, 50, 20, or 10 times S, for example. In some embodiments, the spacing S is greater than 10 W, or greater than 20 W, or greater than 30 W, for example. The spacing S may be up to 1000 or 10,000 times W, for example.

In some embodiments, each fin has a maximum height H1 along the height direction 147 and a minimum width W1 along a direction orthogonal to the height direction. The plurality of fins 110 can have an average H1/W1 of at least 40 or H1/W1 can be in any range described elsewhere herein for H/W.

In some embodiments, the polymeric film 100 has a length L along the length direction (z-direction) of greater than 1, 10, 30, or 100 m.

In some embodiments, the first and second portions 111 and 112 have different respective first and second compositions. In some embodiments, the substrate 120 comprises the first composition. In some embodiments, the first composition is a first polyester composition, and the substrate comprises a second polyester composition. In some embodiments, the first and second polyester compositions are different. In some embodiments, the first and second polyester compositions are a same polyester composition. The polyester compositions can include greater than 50 weight percent polyester.

In some embodiments, the first portion 111, but not the second portion 112, is bonded directly to the substrate 120. For example, the first portion 111 and the substrate 120 can be formed from the same composition or can be formed from similar polymers (e.g., polymers including at least one same monomer unit) that bond well to one another while the second portion 112 is formed from a different composition that has weaker bonding to the substrate 120 so that when the fins (or extended elements) are formed and rotated, as described further elsewhere herein, the second portion 112 can detach from the substrate 120. In some embodiments, the first composition is a polyester composition. In some such embodiments, or in other embodiments, the second composition comprises at least one of an olefin composition and a styrenic composition. In some such embodiments, or in other embodiments, the second composition is an olefin composition. An olefin composition can include greater than 50 weight percent olefin. Similarly, a styrenic composition can include greater than 50 weight percent styrene-containing polymer(s). A composition that includes a substantial amount (e.g., greater than 10 or 20 weight percent) of olefin and styrene-containing compounds may be referred to as either or both of an olefin composition and a styrenic composition or may be referred to as an olefin/styrenic composition.

In some embodiments, the compositions are selected such that the first and second portions 111 and 112, and/or the second portion 112 and the substrate 120, have surface tensions differing from one another by at least 10%. The surface tensions may differ from one another by at least 15%, or at least 20%, for example. The surface tensions may differ by up to about 130%, about 100%, or about 80%, for example. Surface tensions of polymers used in the films can often be found in standard tables of surface tensions, as would be appreciated by those of ordinary skill in the art. Surface tension can be measured using contact angle measurements as described in ASTM D7490-13 "Standard Test Method for Measurement of the Surface Tension of Solid Coatings, Substrates and Pigments using Contact Angle Measurements", for example.

In some embodiments, the plurality of fins 110 (or extended elements) and the substrate 120 are integrally formed. In some embodiments, the plurality of fins 110 (or extended elements) and the substrate 120 are coextruded.

In some embodiments, the compositions used in the fins (or extended elements) and substrates include thermoplastic polymers that can be selected to be readily extrudable and processable. For example, the thermoplastic polymers can be selected to have molecular weights and/or intrinsic viscosities and/or melt flow indices (MFIs) in suitable ranges for extrudability. In some embodiments, the thermoplastic polymers have a weight-averaged molecular weight Mw greater than 20,000 Daltons or greater than 35,000 Daltons, or greater than 50,000 Daltons. The weight-averaged molecular weight Mw may be up to 1,000,000 Daltons, or up to 600,000 Daltons, or up to 400,000 Daltons, or up to 200,000 Daltons or up to 150,000 Daltons, for example. In some such embodiments, or in other embodiments, the thermoplastic polymers have an intrinsic viscosity in range of 0.3 dl/g to 1.2 dl/g or 0.4 dl/g to 1.0 dl/g when measured in a solvent blend comprising 60 weight percent o-chlorobenzene and 40 weight percent phenol. In some such embodiments, or in other embodiments, the thermoplastic polymers have a melt flow index greater than 5 g/10 min, or greater than 10 g/10 min, or greater than 20 g/10 min. The melt flow index may be up to 300 g/10 min, or up to 200 g/10 min, or up to 100 g/10 min, for example. The weight averaged molecular weight Mw can be determined using gel permeation chromatography, for example. The intrinsic viscosity can be determined using a capillary viscometer, for example. The melt flow index, which may alternatively be referred to as melt flow rate, can be determined using an extrusion plastometer according to ASTM D1238-20, for example.

Suitable materials for the various portions of the films of the present description include, for example, polyethylene naphthalate (PEN), coPEN (copolyethylene naphthalate terephthalate copolymer), polyethylene terephthalate (PET), polyhexylethylene naphthalate copolymer (PHEN), glycol-modified PET (PETG), glycol-modified PEN (PENG), syndiotactic polystyrene (sPS), THV (a terpolymer of tetrafluoroethylene, hexafluoropropylene and vinylidene fluoride), polymethyl methacrylate (PMMA), coPMMA (a copolymer of methyl methacrylate and ethyl acrylate), styrenic block copolymers (block copolymers including styrene blocks) such as linear triblock copolymers based on styrene and ethylene/butylene (e.g., styrene-ethylene/butylene-styrene (SEBS) copolymers), acrylic block copolymers (block copolymers including acrylate or methacrylate blocks) such as a linear triblock copolymers based on methyl methacrylate and n-butyl acrylate, anhydride-modified ethylene vinyl acetate polymers, ketone ethylene ester terpolymers, polyolefin thermoplastic elastomer, polypropylene (PP), co-polypropylene (coPP) such as copolymers of propylene and ethylene, urethanes such as thermoplastic polyurethanes (TPUs), or blends thereof.

Atactic polystyrene (aPS) can optionally be blended with sPS (e.g., at about 5 to about 30 weight percent aPS) to adjust the refractive indices of the resulting layer and/or to reduce the haze of the layer (e.g., by reducing a crystallinity of the layer). Suitable THV polymers are described in U.S. Pat. Appl. Pub. No. 2019/0369314 (Hebrink et al.), for example, and include those available under the DYNEON THV tradename from 3M Company (St. Paul, MN). In some embodiments, THV can contain about 35 to about 75 mole percent tetrafluoroethylene, about 5 to about 20 mole percent hexafluoropropylene, and about 15 to about 55 mole percent vinylidene fluoride. Suitable styrenic block copolymers include KRATON G1645 and KRATON G1657 available from KRATON Polymers (Houston, TX). Suitable acrylic block copolymers include those available under the KURARITY tradename from Kuraray Co., Ltd. (Tokyo, JP). PETG can be described as PET with some of the glycol units of the polymer replaced with different monomer units, typically those derived from cyclohexanedimethanol. PETG can be made by replacing a portion of the ethylene glycol used in the transesterification reaction producing the polyester with cyclohexanedimethanol, for example. Suitable PETG copolyesters include GN071 available from Eastman Chemical Company (Kingsport, TN). PEN and coPEN can be made as described in U.S. Pat. No. 10,001,587 (Liu), for example. Low melt PEN is a coPEN including about 90 mole percent naphthalene dicarboxylate groups based on total carboxylate groups and is also known as coPEN 90/10. Another useful coPEN is coPEN 70/30 which includes about 70 mole percent naphthalene dicarboxylate groups and about 30 mole percent terephthalate dicarboxylate groups based on total carboxylate groups. More generally, coPEN Z/100-Z may be used where coPEN Z/100-Z includes Z mole percent naphthalene dicarboxylate groups (typically greater than 50 mole percent and no more than about 90 mole percent) and 100-Z mole percent terephthalate dicarboxylate groups based on total carboxylate groups. Glycol-modified polyethylene naphthalate (PENG) can be described as PEN with some of the glycol units of the polymer replaced with different monomer units and can be made by replacing a portion of the ethylene glycol used in the transesterification reaction producing the polyester with cyclohexanedimethanol, for example. PHEN can be made as described for PEN in U.S. Pat. No. 10,001,587 (Liu), for example, except that a portion of the ethylene glycol (e.g., about 40 mole percent) used in the transesterification reaction is replaced with hexanediol. Suitable PET can be obtained from Nan Ya Plastics Corporation, America (Lake City, SC), for example. Suitable sPS can be obtained from Idemitsu Kosan Co., Ltd. (Tokyo, Japan), for example. Suitable PMMA can be obtained from Arkema Inc., Philadelphia, PA., for example. Suitable anhydride-modified ethylene vinyl acetate polymers include those available from Dow Chemical (Midland, MI) under the BYNEL tradename, for example. Suitable ketone ethylene ester terpolymers include those available from Dow Chemical (Midland, MI) under the BYNEL tradename, for example. Suitable polyolefin thermoplastic elastomers include those available from Mitsui Chemicals (Tokyo, Japan) under the ADMER tradename. Suitable coPP includes PP8650 (random copolymer of propylene and ethylene) available from Total Petrochemicals, Inc. (Houston, TX).

Figures 3, 4A:
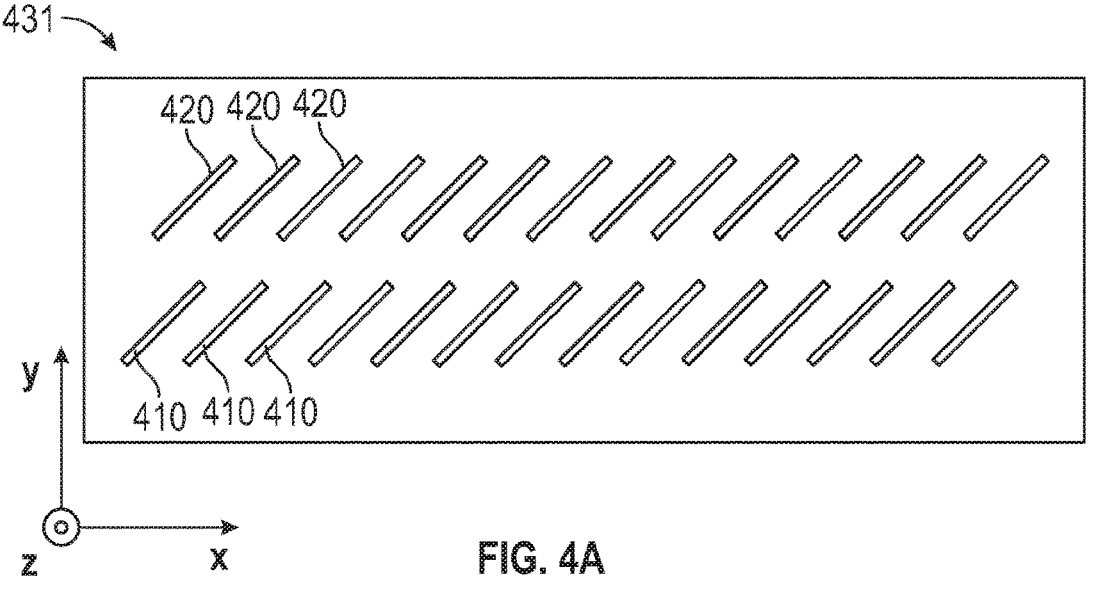
FIG. 3 is a schematic plan view of a die for extruding a polymeric film, according to some embodiments.
FIGS. 4A-4C are schematic cross-sectional views of a slot plate, according to some embodiments.

FIG. 3 is a schematic plan view of a die 444 for extruding a polymeric film, according to some embodiments. The die 444 includes a slot plate 431, skin block 432, and a compression section 433. The compression section 433 compresses the extruded web in the thickness direction (y-direction) and may optionally compress the web in the width direction (x-direction). The die 444 may include other elements which are not illustrated but are commonly used in extrusion dies, as would be appreciated by the person of ordinary skill in the art.

Figure 4B:
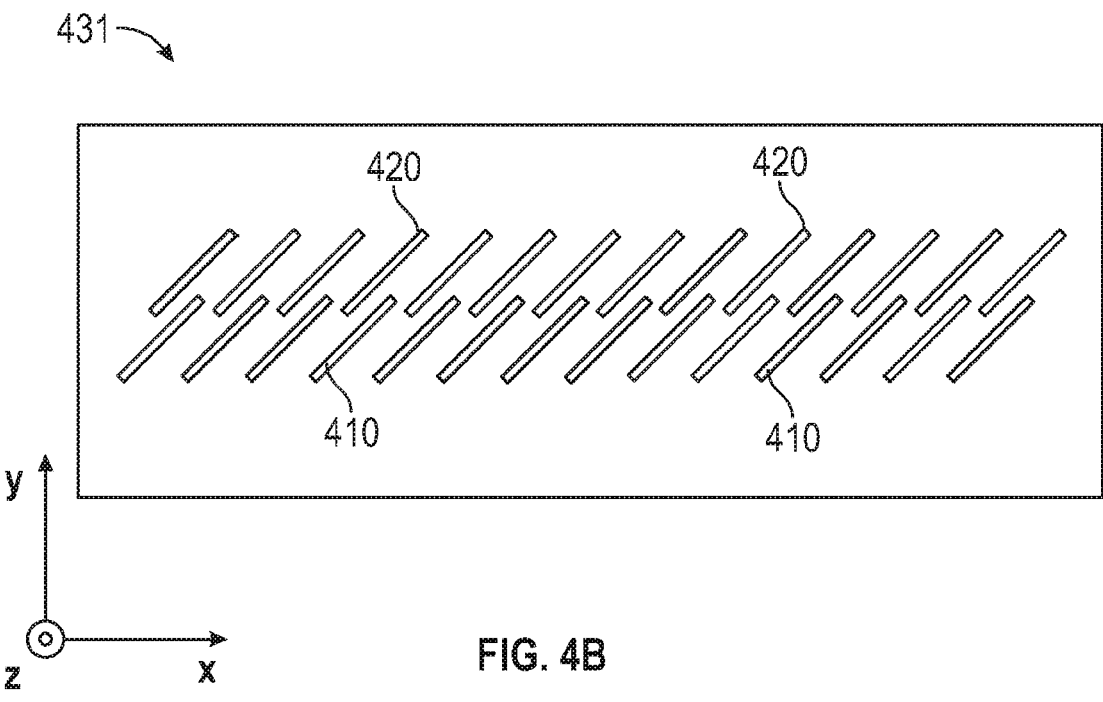
Figure 4C:
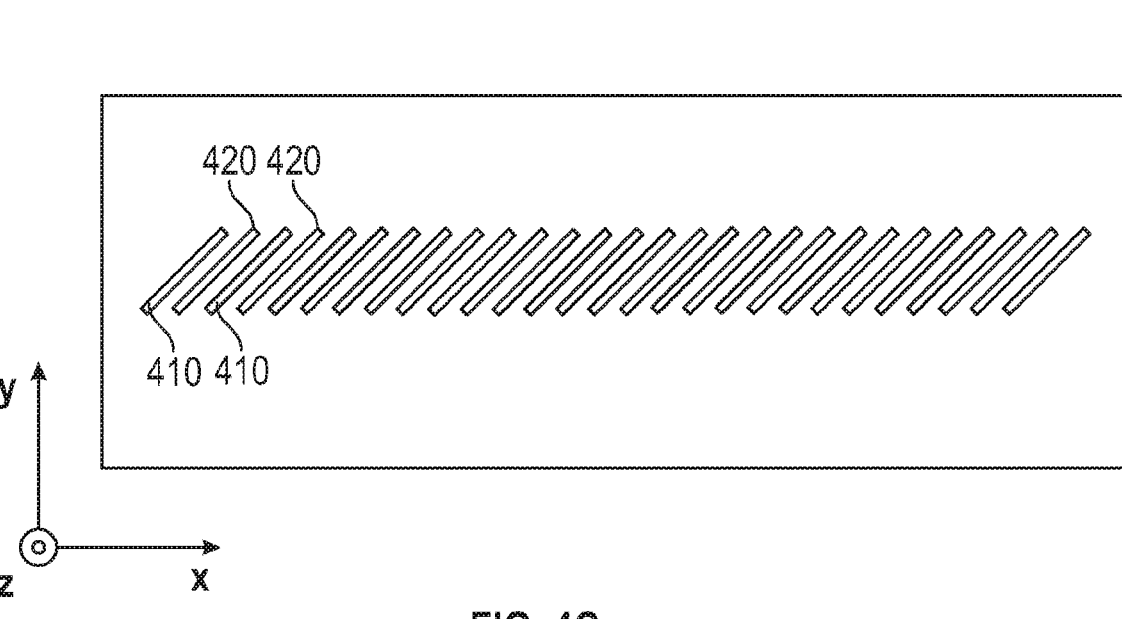
Figure 8:
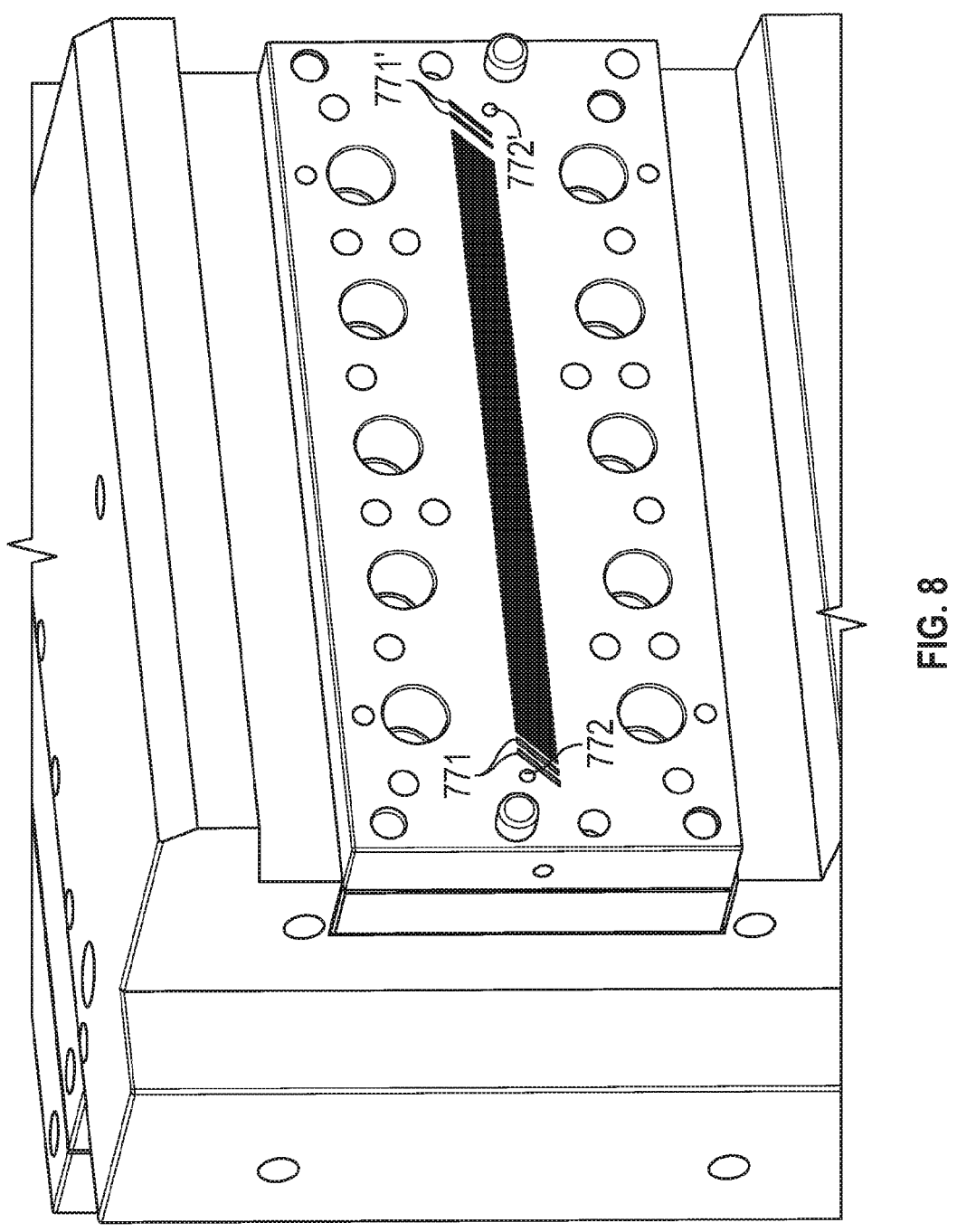
FIG. 8 is a schematic end view of a slot plate, according to some embodiments.
Figure 9:
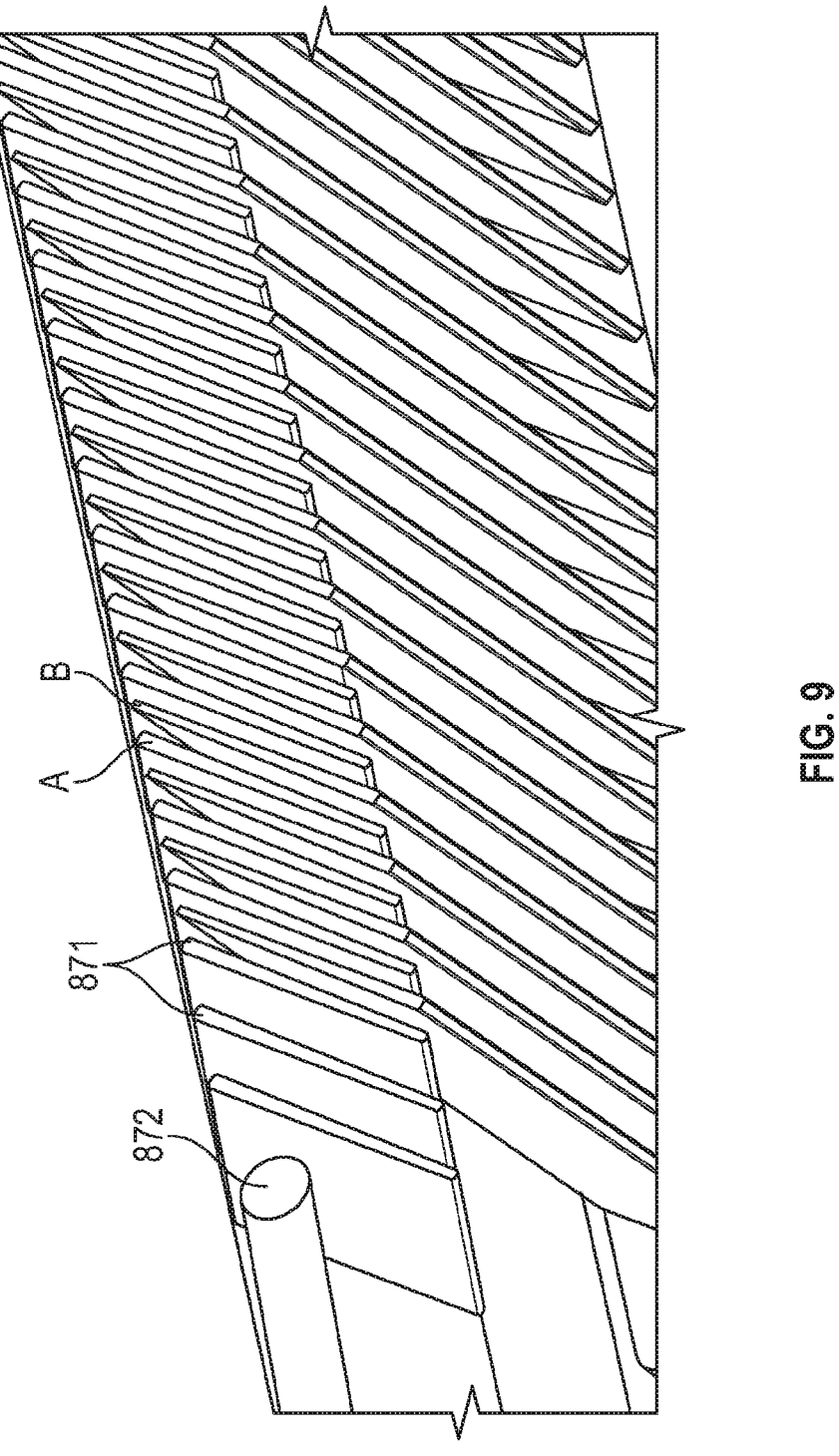
FIG. 9 is a schematic illustration of a polymer flow path through a slot plate, according to some embodiments.
Figure 10:
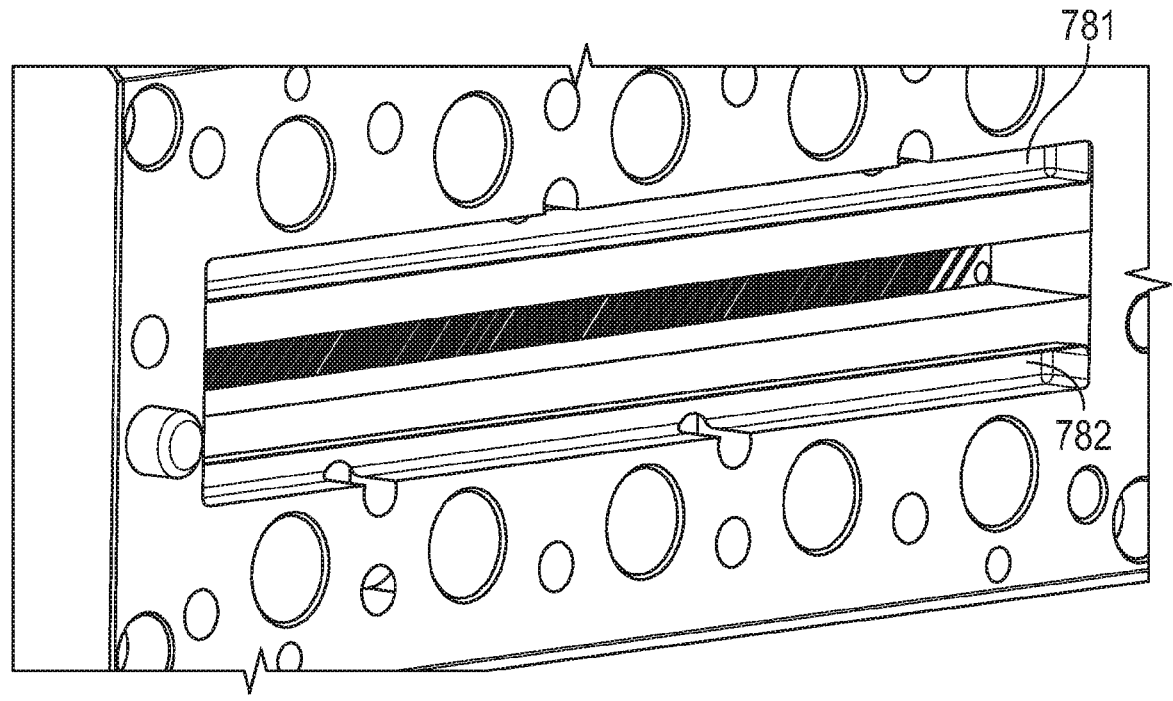
FIG. 10 is a schematic end view of a skin plate, according to some embodiments.

FIGS. 4A-4C are schematic cross-sectional views of the slot plate 431, according to some embodiments. FIG. 4A is a cross-section adjacent an input side of the slot plate 431, FIG. 4C is a cross-section adjacent an output side of the slot plate 431, and FIG. 4B is a cross-section between those of FIGS. 4A and 4C. The slots are schematically shown as rectangular slots in FIGS. 4A-4C but may alternatively have other shapes (e.g., to promote flow to certain areas). For example, the slots may have rounded edges or may have a generally trapezoidal shape. The slot plate 431 may include other features such as holes on opposite sides of the pluralities of slots 410, 420 to provide channels to promote flow and to fill in material in the corner regions on the sides of the pluralities of slots 410, 420. There may also be additional slots at one or both sides of the plurality of slots 410 and additional slots at one or both sides of the plurality of slots 420 that do not interlace with one another. The additional hole(s) and/or non-interlaced slot(s) may help stabilize the extruded web, for example. As described further in the Examples, FIG. 8 is a schematic end view of a slot plate showing holes 772, 772' and non-interlaced slots 771, 771', according to some embodiments. FIG. 9 is a schematic illustration of polymer flow produced by the slot plate of FIG. 8, and FIG. 10 schematically illustrates the slot plate of FIG. 8 adjacent a skin plate. The slot plate 431, and other die elements, can be made using conventional machining techniques such as wire electrical discharge machining (EDM).

Figures 5A, 5B:
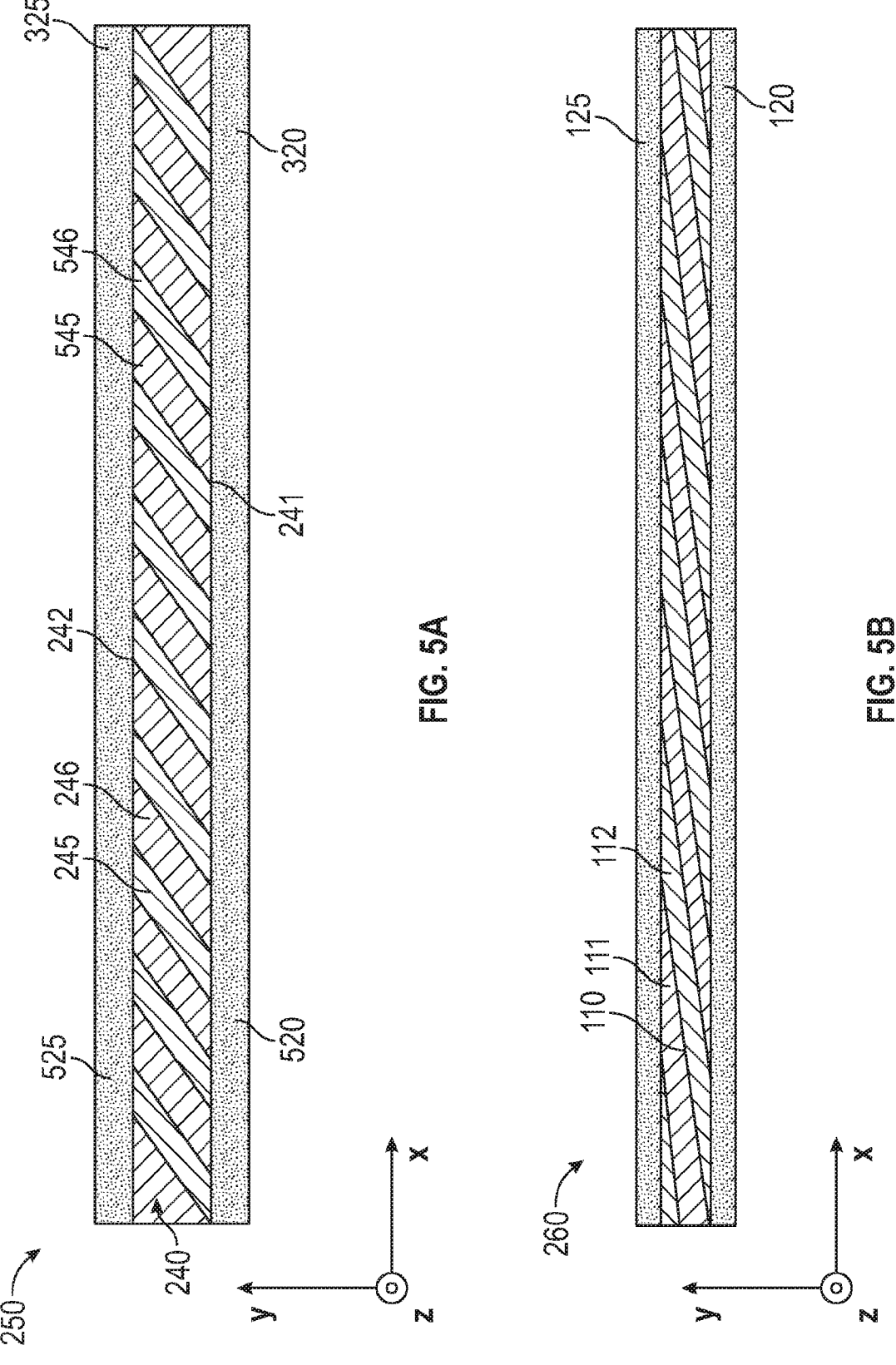
FIG. 5A is a schematic cross-sectional view of a molten film, according to some embodiments.
FIG. 5B is a schematic cross-sectional view of a film, according to some embodiments, which may correspond to the molten film of FIG. 5A after being compressed.

FIG. 5A is a schematic cross-sectional view of a molten film 250, according to some embodiments. The molten film 250 can correspond to the molten film formed by the slot plate 431 and the skin block 432 prior to being compressed in the compression section 433. The molten film 250 includes a molten stack 240 of alternating first and second extended elements 245 and 246 disposed between first and second skin layers 325 and 320. The first and second extended elements 245 and 246 have different first and second compositions 545 and 546, and the first and second skin layers 325 and 320 have third and fourth compositions 525 and 520 which may be the same or different. For example, the third and fourth compositions 525 and 520 may be a same composition which may be the same as one of the first and second compositions 545 and 546.

FIG. 5B is a schematic cross-sectional view of a polymeric film 260, according to some embodiments. The polymeric film 260 can correspond to the molten film 250 after being compressed in the compression section 433 and being cooled. The polymeric film 260 may be described as including a plurality of alternating first and second extended elements 111 and 112 disposed between first and second skin layers 125 and 120. The first and second extended elements 111 and 112 may be the first and second extended elements 245 and 246 after the molten film 250 is compressed and cooled to form the polymeric film 260. Similarly, the first and second skin layers 125 and 120 may be the first and second skin layers 325 and 320 after the molten film 250 is compressed and cooled to form the first polymeric film 260.

Figure 5C:
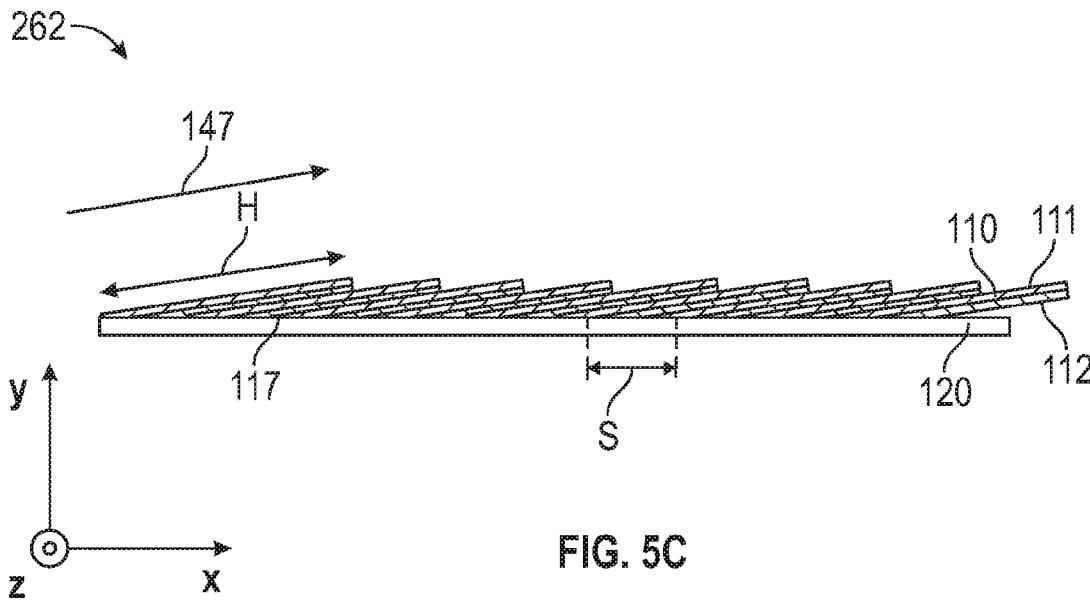
FIG. 5C is a schematic cross-sectional view of a film, according to some embodiments, which may correspond to the film of FIG. 5B after a skin layer has been removed.

FIG. 5C is a schematic cross-sectional view of a polymeric film 262, according to some embodiments. The polymeric film 262 can correspond to the polymeric film 260 after the skin layer 125 has been removed.

In some embodiments, a polymeric film 260, 262 includes a first substrate 120 and a plurality of fins 110 extending along a length direction (z-direction) of the polymeric film and being substantially coextensive with the first substrate 120 along the length direction. The fins 110 extending along a height direction 147 to an average height H from attachment portions 117 of the fins attached to the first substrate 120. The attachment portions 117 are spaced apart and arranged at an average spacing S along a width direction (x-direction) of the polymeric film substantially orthogonal to the length direction and to a thickness direction (y-direction) of the polymeric film. H is greater than S and the height direction 147 is sufficiently tilted relative to the thickness direction that adjacent fins contact one another. In some embodiments, the polymeric film 260 further includes a second substrate 125, where the plurality of fins 110 are disposed between the first and second substrates 120 and 125.

In some embodiments, each fin in a least a majority of the fins (or extended elements) includes first and second portions 111 and 112 attached to one another and substantially coextensive with the fin. The first and second portions 111 and 112 can have different respective first and second compositions as described further elsewhere herein. In some embodiments, the first substrate 120 comprises the first composition. In some such embodiments, or in other embodiments, the polymeric film 260 includes the second substrate 125, where the second substrate 125 comprises second composition.

Figure 6:
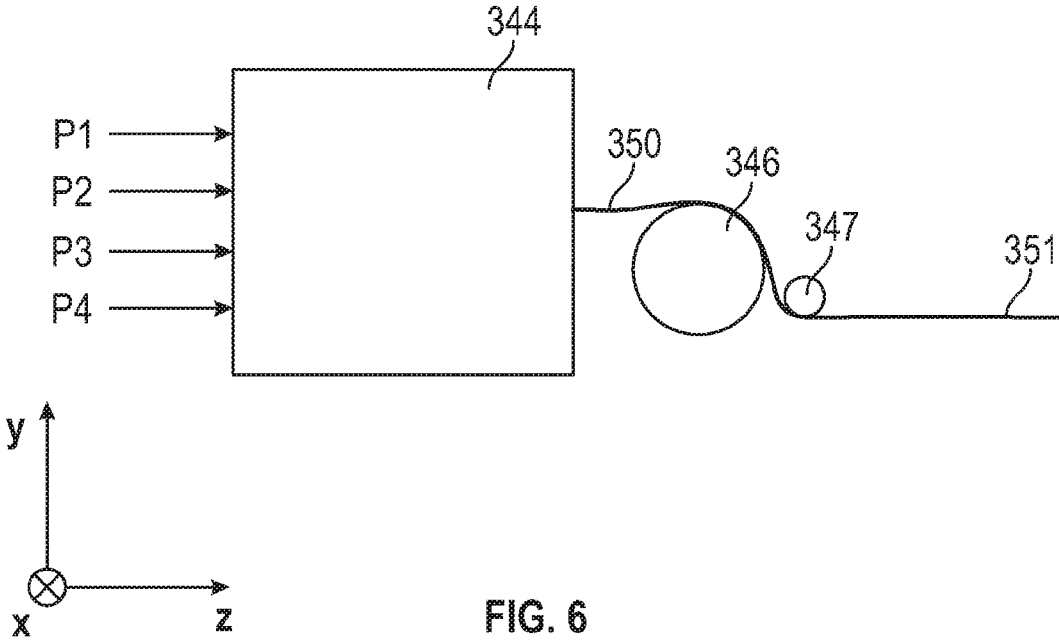
FIG. 6 is a schematic illustration of a method of making a film, according to some embodiments.

FIG. 6 is a schematic illustration of a method of making a polymeric film, according to some embodiments. Resins P1 and P2, and optionally one or both of P3 and P4, are extruded through extrusion die 344 (e.g., corresponding to die 444) to form an extruded web 350 which is cooled by casting the extruded web against a casting wheel 346 (also referred to as a chill roll) to form a cast web 351 which may correspond to first polymeric film 260. An optional roller 347 may be included and additional rollers (not shown) may optionally be included as would be appreciated by the person of ordinary skill in the art. The first and second portions 111 and 112 may be formed from the first and second resins P1 and P2. The first and second substrates 120 and 125 (which may be referred to as skin layers) may be formed from P1 and P2 or from any of P1 through P4. In some embodiments, the first resin P1 comprises a polyester and the second resin P2 comprises an olefin. In some such embodiments, or in other embodiments, the first and second substrates 120 and 125 are formed from resins P3 and P4 which may comprise polyesters and may be the same or different from the first resin P1. In some embodiments, the first and second extended elements 111 and 112 in the first polymeric film 260 has surface tensions differing from one another by at least 10% or in a range described elsewhere herein.

In some embodiments, a method for making at least a first polymeric film is provided. The first polymeric extends along a length direction of the first polymeric film and has a width along a width direction of the first polymeric film orthogonal to the length direction. The method includes extruding first and second resins (e.g., P1 and P2) through respective first (410) and second (420) pluralities of slots in a slot plate 431 to form a molten stack 240 of alternating respective first and second extended elements 245 and 246. Each of the first and second pluralities of slots has a flow direction (e.g., 158, 159 schematically illustrated in FIG. 3) angled relative to a first plane (plane 455 or xz-plane) defined by the length and width directions. The first and second extended elements 245 and 246 extend along the length direction and are tilted in a second plane (yx-plane) orthogonal to the length direction. The method includes extruding first (325) and second (320) skin layers (e.g., via skin block 432) onto respective opposite first and second sides 242 and 241 of the molten stack to form a molten film 250; compressing (e.g., in compression section 433) the molten film in a thickness direction (y-direction) orthogonal to the length and width directions; and cooling the molten film to form the first polymeric film 260.

In some embodiments, the flow direction 158, 159 of each of the first and second pluralities of slot makes an angle θ1, θ2 in a range of 5 to 85 degrees, or 10 to 90 degrees, 20 to 80 degrees, 30 to 60 degrees, or 40 to 50 degrees with the first plane. Each of the angles θ1, θ2 may be about 45 degrees, for example.

In some embodiments, the method further includes removing the first (125), but not the second (120), skin layer from the first polymeric film 260 to form a second polymeric film 262 having a plurality of tilted fins 110 formed from the first and second extended elements 245 (or 111) and 246 (or 112). In some embodiments, the method further includes rotating the tilted fins so that the fins extend generally away from the second skin layer (e.g., rotating the fins of FIG. 5C so that they extend generally away from skin or substrate 20 as schematically illustrated in FIG. 1). In some embodiments, each tilted fin in at least a majority of the tilted fins comprises adjacent first and second portions 111 and 112 extending generally parallel to each other and bonded to each other along at least a portion of the tilted fins. In some embodiments, rotating the tilted fins causes the first and second portions 111 and 112 to separate from one another along at least a portion of the fins adjacent the second skin layer 120. It has been found that the first and second portions 111 and 112 can remain bonded to one another near the tips of the portions but that adjacent fins 110 can separate from one another when the fins are rotated.

Figure 7A:
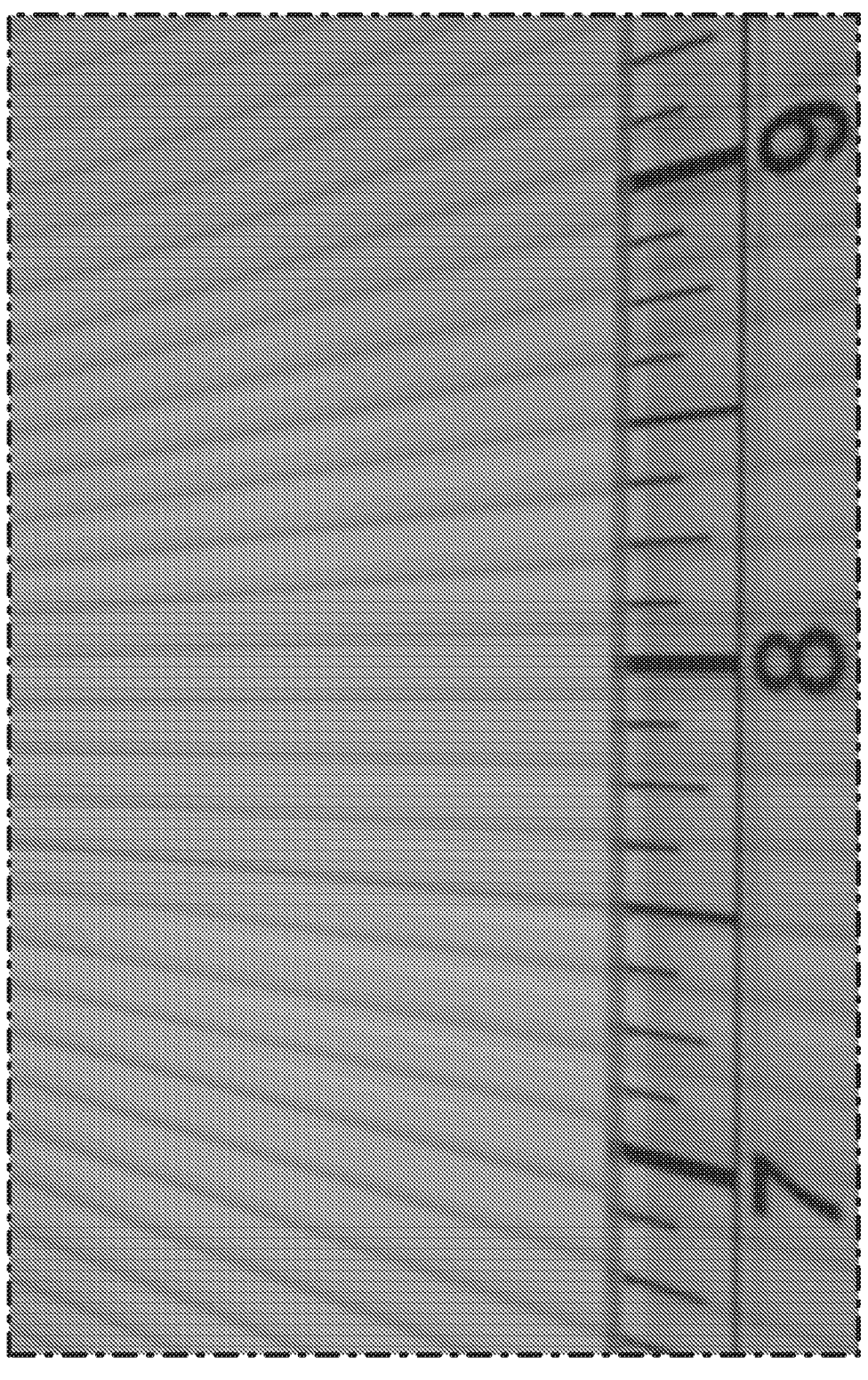
FIG. 7A is a top perspective image of an exemplary polymeric film.
Figure 7B:
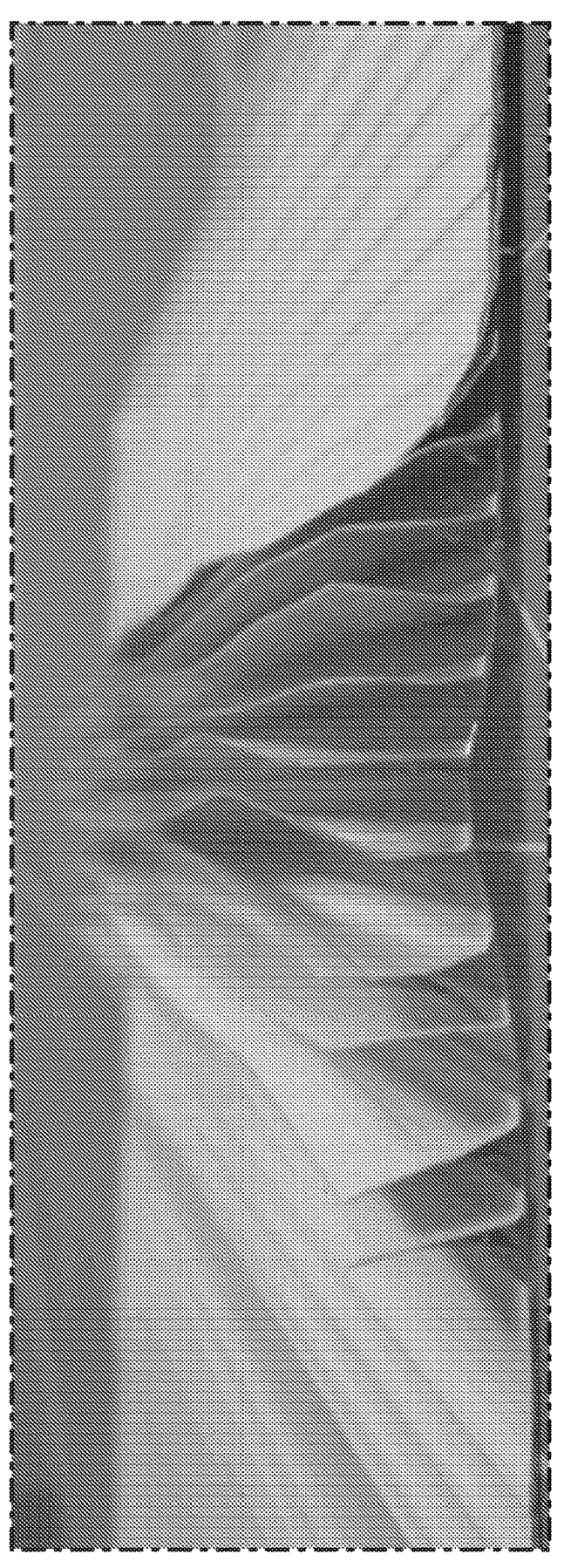
FIG. 7B is a perspective image of an exemplary polymeric film.
Figure 7C:
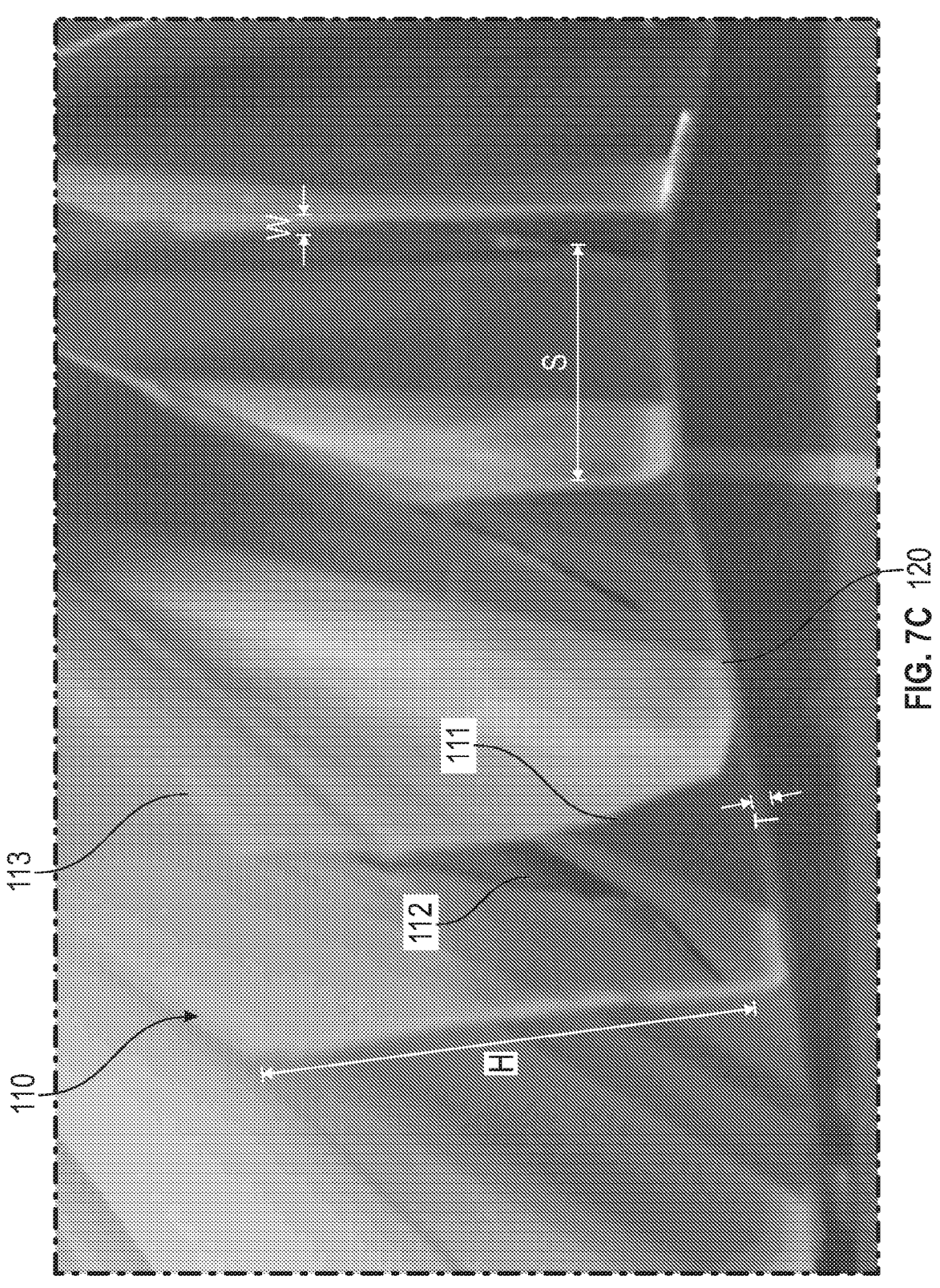
FIG. 7C is a perspective image of a portion of the polymeric film of FIG. 7B.

FIG. 7A is a top perspective image of an exemplary polymeric film that may correspond to polymeric film 260. The fins of the exemplary polymeric film included dye in one of the first and second portions of the fins. Edges of the portion with dye are visible in FIG. 7A as dark stripes. FIG. 7B is a perspective image of an exemplary polymeric film where a top skin (e.g., of the polymeric film of FIG. 7A) has been removed and fins in a portion of the film has been rotated so that they extend generally away from a bottom skin or substrate of the film. FIG. 7C is a perspective image of a portion of the polymeric film of FIG. 7B at an expanded scale relative to that of FIG. 7B.

In some embodiments, the first polymeric film 260, or the second polymeric film 262, includes a first substrate 120 and a plurality of fins 110 extending along a length direction (z-direction) of the polymeric film. The fins 110 extend along a height direction 147 to an average height H from attachment portions 117 of the fins attached to the first substrate 120. The attachment portions 117 can be spaced apart by an average spacing S along a width direction (x-direction) of the polymeric film substantially orthogonal to the length direction (z-direction) and to a thickness direction (y-direction) of the polymeric film 260, 262. H can be greater than S. H, S, and/or H/S can be in any range described elsewhere herein. The height direction 147 for the polymeric film 260, 262 can be sufficiently tilted relative to the thickness direction that adjacent fins contact one another.

Figure 11:
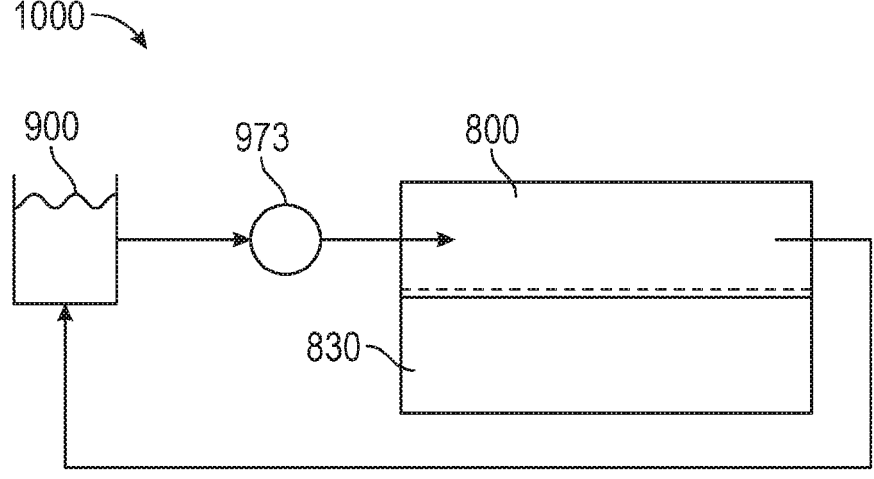
FIG. 11 is a schematic cross-sectional view of a thermal management system, according to some embodiments.

FIG. 11 is a schematic cross-sectional view of a thermal management system 1000, according to some embodiments. The thermal management system 1000 includes a pump 973 for circulating a fluid 900 between fins of a film 800 which may correspond to polymeric film 100, for example. The film 800 can be disposed on an object or device 830 which is desired to be cooled or heated. An adhesive may be disposed between the film 800 and the object or device 830 to bond the film to the object or device. Alternatively, the film 800 may include an adhesive for bonding to the object or device 830. The adhesive may be a thermally conductive adhesive (e.g., the adhesive may include thermally conductive filler). The fluid 900 may be a cooling fluid (e.g., maintained at a temperature less than a predetermined operating temperature of a device) or a heating fluid (e.g., maintained at a temperature higher than a predetermined temperature of an object). In some embodiments, a film 800 is provided that includes polymeric film 100 (see, e.g., FIG. 1) and a liquid 900 at least partially filling a space between adjacent fins 110 of the polymeric film 100. The film 100, 800 may optionally include an additional layer disposed on the tops of the fins 110 to define channels between the substrate 120 of the polymeric film 100 and the additional layer. The additional layer may be bonded to the tips of the fins 110 via an adhesive layer for example.

EXAMPLES

Films with extended elements (fins or louvers) were prepared and manipulated. Physical attributes were evaluated and are shown in the following examples.

These examples are merely for illustrative purposes only and are not meant to be limiting on the scope of the appended claims. All parts, percentages, ratios, etc. in the examples and the rest of the specification are by weight, unless noted otherwise. The following abbreviations are used herein: mils=thousands of an inch, mm=millimeter, cm=centimeter, ° C.=Centigrade, sec=seconds, %=percent, in=inch, IV=intrinsic viscosity, MFI=Melt Flow Index.

TABLE 1

Materials

| Abbreviation | Description |
|---|---|
| PET | Polyethylene terephthalate, Tairilin 1N404, a 0.64 IV PET available from NanYa Plastics Corporation, Lake City SC |
| PETG | Glycol modified PET available under the tradename GN071 from Eastman Chemical Company, Kingsport, TN |
| PP | Pro-Fax SR549M, an 11 MFI polypropylene copolymer, containing 7 wt % PE. Available from LyondellBassell, Houston, TX. |
| Kraton | Kraton G1645, a Styrene-Ethylene/Butylene-Styrene block copolymer. Available from Kraton Corporation, Houston, TX. |
| MB1 | Master Batch 1, PET with 2.5% CERES Blue XR-RF dye. CERES Blue XR-RF available from Lanxess, Cologne, Germany |
| MB2 | Master Batch 2, PP with 2.5% CERES Blue XR-RF dye. CERES Blue XR-RF available from Lanxess, Cologne, Germany |
| MB3 | Master Batch 3, 0.62 IV PET compounded with 13 wt % R-101 $TiO_2$. $TiO_2$ available from Chemours, Wilmington, DE |

Examples E1-E5

The hardware to form the film with a substrate and plurality of fins included a dual manifold die where each manifold feeds a series of slots cut in a slot plate. The slots were 0.687 inch (17.45 mm) long×0.033 inch (0.84 mm) on the wide end and 0.022 inch (0.56 mm) on the narrow end (trapezoidal shape). The slots were spaced 0.066 inch (1.68 mm) on center at the outlet side. These slots were angled in the yz-plane from the manifold to the centerline of the die and interlaced to form an ABAB . . . pattern as shown in FIG. 3. The slots were also tipped in the xy-plane (see, e.g., FIGS. 4A-4C) by 45 degrees as shown in FIG. 8. At each edge of the slot plate were several slots 771, 771' that were not interlaced because the inlet end of the opposing slot would be beyond the feed manifold. To promote flow in the manifold and "fill in" the corner of the louver stack, a hole 772, 772' angled in the yz-plane was drilled at each end of the slot plate. The output films have a solid band of A resin on one edge and a solid band of B resin on the other edge.

FIG. 9 shows the resultant polymer flow path through the slot plate. An AB interlaced pattern and polymer flows 871 and 872 corresponding to slots 771 and hole 772, respectively, are illustrated.

After the louver stack was formed, the resin flowed into a skin plate as shown in FIG. 10, which applied a skin layer on the top and bottom of the stack through respective channels 781 and 782. The skin layer could be the same resin as one or both of the louvers or one or two different resins. Of particular interest was when the top skin layer matches louver resin A and the bottom skin layer matches louver resin B.

The louver stack plus skins flowed to the die exit, being compressed in the y-direction from 0.50 inches (1.3 cm) high to approximately 0.050 inches (0.13 cm). The x-direction width remained constant from the slot plate to the die exit.

Examples Preparation:

Utilizing the configuration depicted above, a series of films were produced using the following equipment set-up: The chilled roll (wheel) side skin layer was fed by a Leistritz 18 mm TSE (twin-screw extruder) which was run under vacuum and utilized a progressive temperature profile with an 8/0 temp of 260-271° C. The associated gear pump and neck tube also were heated to 260-271° C. The air side skin layer was fed by a 27 mm Leistritz (Leistritz Extrusion Technologies, Nurnberg, Germany) TSE which was run under vacuum and also utilized a progressive temp profile with an 8/0 temp at 260-271° C. The associated gear pump and neck tube also were heated to 260-271° C. Each set of the discontinuous, slanted layers were fed by a 27 mm Leistritz TSE which was run under vacuum and utilized a progressive temp profile with an 8/0 temp at 260-271° C. The associated gear pump and neck tube also were heated to 260-271° C. The die, which was described in detail above was positioned just above a 27° C. rotating chilled roll with associated electrostatic pinning for rapid web quenching. The substrates described above were produced on this equipment with cast web thicknesses range from 12 to 30 mils in thickness.

Table 2 shows the material composition details for the cast webs (films) produced.

TABLE 2

| Example | Air Side Skin (A) | 1ˢᵗ Louvers (B) | 2ⁿᵈ Louvers (C) | Chilled Roll Side Skin (D) |
|---|---|---|---|---|
| E1 | 8 pound/hour PP | 12 pound/hour PP | 7.75 pound/hour PETG/ 0.25 pound/hour MB1 | 12 pound/hour PET |
| E2 | 8 pound/hour PP | 13.5 pound/hour PP | 5.75 pound/hour PETG/ 0.25 pound/hour MB1 | 12 pound/hour PET |

TABLE 2-continued

| Example | Air Side Skin (A) | 1ˢᵗ Louvers (B) | 2ⁿᵈ Louvers (C) | Chilled Roll Side Skin (D) |
|---------|-------------------|------------------|------------------|----------------------------|
| E3 | 8 pound/hour PP | 4.5 pound/hour PP | 19.75 pound/hour PETG/ 0.25 pound/hour MB1 | 12 pound/hour PETG |
| E4 | 7 pound/hour PP/ 1 pound/hour Kraton | 8 pound/hour PP/ 1 pound/hour Kraton | 11.75 pound/hour PETG/ 0.25 pound/hour MB1 | 12 pound/hour PETG |
| E5 | 8 pound/hour PP | 5.5 pound/hour PP 0.5 pound/hour MB2 | 7 pound/hour PETG/ 1 pound/hour MB3 | 11 pound/hour PETG |

Cast web films were then manipulated as follows:

1) One of the skins was removed from the web. In most cases, one of the skins readily detached due to low adhesive force between one of the louvers and the skin.

2) A stylus, probe or fingertip, for the various samples, was utilized to manipulate the louvers (fins), going "against the grain" of the louver as extruded. The louvers were essentially parallel to the base layer of the substrate after extrusion, but formed discontinuous ~¼ inch (0.64 cm) wide channels with one end of the channel attached to the base layer and the other free floating, like fish scales. The louvers could be readily rotated when probed against the grain.

3) When the louvers were rotated beyond a certain non-recoverable point, they tended to stick up roughly perpendicular to the cast web film. These louvers were about 3/16 inch to 5/16 inch (0.35 to 0.79 cm) in height.

Typical dimensions of the films were as follows. Before the fins were manipulated, the base film was typically about 24 mils thick. The peeled off top substrate was roughly 6-7 mils thick, the bottom substrate was roughly 6-7 mils thick, and the louvers were each 5.5 to 6 mils thick. The louvers were arranged at about 6-7 per inch (about 2.4-2.8 per cm).

FIGS. 7A-7C are images of Example E5. FIG. 7A shows the film prior to manipulation, followed by FIG. 7B of the same film that has been unzipped and then manipulated as described above to produce a base film with a >¼ inch (0.64 cm) fin projecting at ~90 degrees from the film surface. The middle portion of the film in FIG. 7B has been manipulated to produce essentially perpendicular fins of ~¼ inch (0.64 cm) height. FIG. 7C is a close-up view of the middle portion. In FIG. 7B, the discontinuous and flat positioning of the unmanipulated fins immediately to either side of the perpendicular channels are visible.

Terms such as "about" will be understood in the context in which they are used and described in the present description by one of ordinary skill in the art. If the use of "about" as applied to quantities expressing feature sizes, amounts, and physical properties is not otherwise clear to one of ordinary skill in the art in the context in which it is used and described in the present description, "about" will be understood to mean within 10 percent of the specified value. A quantity given as about a specified value can be precisely the specified value. For example, if it is not otherwise clear to one of ordinary skill in the art in the context in which it is used and described in the present description, a quantity having a value of about 1, means that the quantity has a value between 0.9 and 1.1, and that the value could be 1.

All references, patents, and patent applications referenced in the foregoing are hereby incorporated herein by reference in their entirety in a consistent manner. In the event of inconsistencies or contradictions between portions of the incorporated references and this application, the information in the preceding description shall control.

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations, or variations, or combinations of the specific embodiments discussed herein. Therefore, it is intended that this disclosure be limited only by the claims and the equivalents thereof.

What is claimed is:

1. A polymeric film having an orthogonal length and width, the polymeric film comprising a substrate and a plurality of fins extending away from the substrate and substantially coextensive with the substrate along the length of the polymeric film, the fins being arranged across the width, each fin in at least a majority of the fins comprising:

a first portion extending from the substrate to a tip of the fin opposite the substrate; and a second portion extending from the tip of the fin toward or to the substrate, the second portion attached to the first portion proximate the tip and separated from the first portion proximate the substrate along at least a portion of a length of the fin, the first and second portions having different respective first and second compositions, the second portion and the substrate having surface tensions differing from one another by at least 10%.

2. The polymeric film of claim 1, wherein the substrate comprises the first composition.

3. The polymeric film of claim 1, wherein the first composition is a first polyester composition and the substrate comprises a second polyester composition.

4. The polymeric film of claim 1, wherein the second composition is an olefin composition.

5. The polymeric film of claim 1, wherein the fins extend from the substrate to an average height H along a height direction and have an average width W at tips of the fins along a direction orthogonal to the height direction, wherein H/W≥40.

6. A polymeric film having an orthogonal length and width, the polymeric film comprising:

a substrate; and a plurality of fins extending along the length and arranged across the width, the plurality of fins being substantially coextensive with the substrate along the length, the substrate having an average thickness T in a direction orthogonal to the length and width, the fins extending from the substrate to an average height H along a height direction and having an average width W at tips of the fins along a direction orthogonal to the height direction, wherein H/W>40 and H/T≥40, each fin in at least a majority of the fins comprises:

a first portion extending from the substrate to a tip of the fin opposite the substrate; and a second portion extending from the tip of the fin toward or to the substrate, the second portion attached to the first portion proximate the tip, the first and second portions having different respective first and second compositions, the second portion and the substrate having surface tensions differing from one another by at least 10%.

7. The polymeric film of claim 6, wherein the fins are arranged at an average spacing S along the width of greater than 20 T.

8. The polymeric film of claim 7, wherein H>S.

9. The polymeric film of claim 6, wherein for each fin in a least the majority of the fins, the second portion is separated from the first portion proximate the substrate along at least a portion of a length of the fin.

10. The polymeric film of claim 1, wherein in at least one cross-section of the polymeric film orthogonal to the length of the polymeric film and for each fin in at least the majority of the fins, the first and second portions directly contact one another proximate the tip and are separated from one another proximate the substrate.

11. The polymeric film of claim 10, wherein for each fin in at least the majority of the fins, each of the first and second portions is a monolithic layer of the fin.

12. The polymeric film of claim 1, wherein for each cross-section of the polymeric film orthogonal to the length of the polymeric film, the fins are arranged at an average spacing S along the width, and the fins have an average width W at tips of the fins, S>10W.

13. The polymeric film of claim 6, wherein in at least one cross-section of the polymeric film orthogonal to the length of the polymeric film and for each fin in at least the majority of the fins, the first and second portions directly contact one another proximate the tip and are separated from one another proximate the substrate.

14. The polymeric film of claim 13, wherein for each fin in at least the majority of the fins, each of the first and second portions is a monolithic layer of the fin.

\*    \*    \*    \*    \*